US010911941B2

(12) United States Patent
Choi et al.

(10) Patent No.: US 10,911,941 B2
(45) Date of Patent: Feb. 2, 2021

(54) RECONFIGURABLE RADIO EQUIPMENT HAVING MULTIPLE RADIO COMPUTERS, AND OPERATION METHOD FOR THE SAME

(71) Applicant: INDUSTRY-UNIVERSITY COOPERATION FOUNDATION HANYANG UNIVERSITY, Seoul (KR)

(72) Inventors: Seung Won Choi, Seoul (KR); Heung Seop Ahn, Seoul (KR); Dae Jin Kim, Seoul (KR); Zhongfeng Zhang, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 0 days.

(21) Appl. No.: 16/811,150

(22) Filed: Mar. 6, 2020

(65) Prior Publication Data

US 2020/0288301 A1 Sep. 10, 2020

Related U.S. Application Data

(60) Provisional application No. 62/815,663, filed on Mar. 8, 2019.

(30) Foreign Application Priority Data

Nov. 21, 2019 (KR) .................. 10-2019-0150412

(51) Int. Cl.
*H04W 8/22* (2009.01)
*H04W 40/02* (2009.01)
*H04W 8/00* (2009.01)
*H04W 8/02* (2009.01)

(52) U.S. Cl.
CPC ............. *H04W 8/22* (2013.01); *H04W 8/005* (2013.01); *H04W 8/02* (2013.01); *H04W 40/02* (2013.01)

(58) Field of Classification Search
CPC ........ H04W 8/22; H04W 8/005; H04W 8/02; H04W 40/02
USPC .................. 455/418, 422.1, 423, 403, 414.1
See application file for complete search history.

(56) References Cited

U.S. PATENT DOCUMENTS

| 7,817,991 | B2 * | 10/2010 | Hinckley | H04W 76/15 |
| | | | | 455/416 |
| 9,350,848 | B2 | 5/2016 | Choi et al. | |
| 10,256,847 | B2 | 4/2019 | Choi et al. | |
| 2015/0326434 | A1 | 11/2015 | Choi et al. | |
| 2016/0198018 | A1 | 7/2016 | Choi et al. | |
| 2017/0147314 | A1 | 5/2017 | Choi et al. | |
| 2019/0007811 | A1 | 1/2019 | Choi et al. | |
| 2019/0166644 | A1 * | 5/2019 | Shaw | H04L 41/12 |
| 2019/0327500 | A1 * | 10/2019 | Yang | H04N 21/236 |
| 2020/0028700 | A1 * | 1/2020 | Zaks | H04W 8/18 |

* cited by examiner

*Primary Examiner* — Nghi H Ly
(74) *Attorney, Agent, or Firm* — Sughrue Mion, PLLC

(57) ABSTRACT

A reconfigurable radio equipment may include at least two radio computers; a communication services layer comprising an administrator, a mobility policy manager, a networking stack, and a monitor; and a routing entity performing communications among the at least two radio computers and the communication services layer.

19 Claims, 13 Drawing Sheets

RECONFIGURABLE RADIO EQUIPMENT HAVING MULTIPLE RADIO COMPUTERS, AND OPERATION METHOD FOR THE SAME

CROSS-REFERENCE TO RELATED APPLICATIONS

This application claims the benefit of priority to U.S. Provisional Patent Application No. 62/815,663 filed on Mar. 8, 2019, and Korean Patent Application No. 10-2019-0150412, filed on Nov. 21, 2019 in the Korean Intellectual Property Office (KIPO), the entire contents of which are incorporated herein by reference.

BACKGROUND

1. Technical Field

The present disclosure relates to a reconfigurable radio equipment, and more specifically, to a method for communications between a communication services layer of a reconfigurable radio equipment including a plurality of radio computers and a radio control framework of each radio computer, and composition of the reconfigurable radio equipment therefor.

2. Related Art

Software Defined Radio (SDR) is a technology enabling global communications by downloading an object-oriented structure application software on a single hardware platform having an open structure for flexible adaptation to various radio access environments.

The SDR technology is a wireless technology that reduces fixed hardware functions in a user's mobile device from the signal processing perspective, extends a programmable hardware portion by a radio application, and increases flexibility of the system by using the extended software programmable capability.

The structure of such the SDR terminal device should be open, distributed, object-oriented, and software-controllable. In particular, a multi-mode SDR that can accommodate various wireless standards is required for global communications. In this environment, research on the multi-mode SDR is currently actively being progressed.

SUMMARY

An objective of the present disclosure is directed to providing a reconfigurable radio equipment. Also, another objective of the present disclosure is directed to providing a method for communications within the reconfigurable radio equipment.

An exemplary embodiment of the present disclosure for achieving the above-described objective of the present disclosure, as the reconfigurable radio equipment, may comprise at least two radio computers; a communication services layer including an administrator, a mobility policy manager, a network stack, and a monitor; and a routing entity performing communications among the at least two radio computers and the communication services layer, wherein the communication services layer operates on a non-real time operating system, each of the at least two radio computers includes a radio operation system which is a real time operating system, and a unified radio application (URA) operates in the at least two radio computers.

The administrator of the communication services layer may be an entity that performs installation or uninstallation of the unified radio application on the at least two radio computers and creation or deletion of an instance of the unified radio application.

The mobility policy manager of the communication services layer may be an entity that performs monitoring of radio environments and capability of the radio equipment, selection among various radio access technologies (RATs), and discovery of peer equipments.

The networking stack of the communication services layer may be an entity that performs transmission and reception of user data.

The monitor of the communication services layer may be an entity that performs a function of receiving computational/spectral resource usage status.

Each of the at least two radio computers may include a radio control framework (RCF) providing an operation environment to the unified radio application; the radio operating system; and at least one radio platform.

The radio control framework may include a configuration manager performing functions for managing and accessing radio parameters for the unified radio application, functions for installing or uninstalling the unified radio application, and functions for creating or deleting an instance of the unified radio application; a radio connection manager performing functions for activating/deactivating the unified radio application according to user requests and management of user data flows; a flow controller performing functions for transmitting and receiving user data packets and controlling a flow of signaling packets; a multiradio controller performing functions for detecting and managing interoperability problems among concurrently executed unified radio applications; and a resource manager performing functions for managing computational resources of a corresponding radio computer and functions for making active unified radio applications share the computational resources.

The routing entity may receive a command for a target radio computer and an identifier (ID) of the target radio computer from the communication services layer, and use the ID of the target radio computer to transfer the command to the target radio computer.

The unified radio application may be downloaded and installed in the at least two radio computers by using a radio application package (RAP), the RAP comprising metadata; radio controller codes; and at least one user-defined functional block (UDFB).

The radio controller codes may be a component that operates in a non-real time domain and processes context information, and is included in the RAP in form of executable codes.

The at least one UDFB may be included in the RAP in form of at least one of source codes, intermediate representation codes, and executable codes executable on at least one of the at least two radio computers.

When the at least one UDFB is included in the RAP in form of the source codes or the intermediate expression codes, the at least one UDFB may be executed by a radio virtual machine (RVM).

Another exemplary embodiment of the present disclosure for achieving the above-described another objective of the present disclosure, as a method for communications with the reconfigurable radio equipment, may comprise receiving, by the communication services layer, a command for a target radio computer among the at least two radio computers from an entity of a higher layer; generating, by the communication services layer, an identifier (ID) of the target radio computer; transmitting, by the communication services layer, the command and the ID of the target radio computer to the routing entity; and transferring, by the routing entity, the command to the target radio computer by using the ID, wherein the communication services layer operates on a non-real time operating system, each of the at least two radio computers includes a radio operation system which is a real time operating system, and a unified radio application (URA) operates in the at least two radio computers.

Each of the at least two radio computers may include a radio control framework (RCF) providing an operation environment to the unified radio application; the radio operating system; and at least one radio platform.

The radio control framework may include a configuration manager performing functions for managing and accessing radio parameters for the unified radio application, functions for installing or uninstalling the unified radio application, and functions for creating or deleting an instance of the unified radio application; a radio connection manager performing functions for activating/deactivating the unified radio application according to user requests and management of user data flows; a flow controller performing functions for transmitting and receiving user data packets and controlling a flow of signaling packets; a multiradio controller performing functions for detecting and managing interoperability problems among concurrently executed unified radio applications; and a resource manager performing functions for managing computational resources of a corresponding radio computer and functions for making active unified radio applications share the computational resources.

The communication services layer may include an administrator, a mobility policy manager, a networking stack, and a monitor.

The administrator of the communication services layer may be an entity that performs installation or uninstallation of the unified radio application on the at least two radio computers and creation or deletion of an instance of the unified radio application.

The mobility policy manager of the communication services layer may be an entity that performs monitoring of radio environments and capability of the radio equipment, selection among various radio access technologies (RATs), and discovery of peer equipments.

The unified radio application may be downloaded and installed in the at least two radio computers by using a radio application package (RAP), the RAP comprising: metadata; radio controller codes; and at least one user-defined functional block (UDFB).

Using the operational structure of the unified radio application according to exemplary embodiments of the present disclosure, it is possible to develop and distribute the radio application that can be executed on various radio platforms. In addition, in aspect of mobile operators, it may become possible to switch radio access technologies of which terminals based on various radio platforms that subscribers are using into desired radio access technologies according to their needs, so that flexible operation of mobile networks can be possible. In addition, in aspect of subscribers, it may become possible that they can use new radio access technologies only by downing a radio application package for a desired radio application and installing the desired radio application in their terminals without purchasing new terminals. Accordingly, the cost of purchasing a new mobile terminal can be reduced, and a single mobile terminal can be used for various radio access technologies, thereby improving user convenience.

DETAILED DESCRIPTION OF THE EMBODIMENTS

Figure 1:
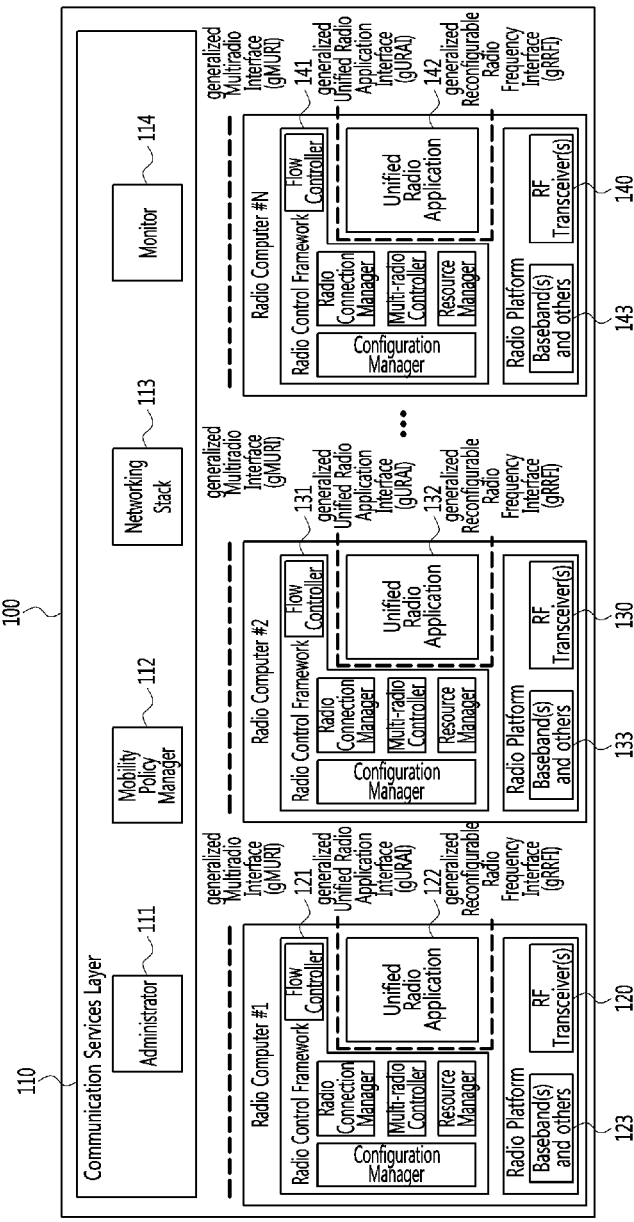
FIG. 1 is a conceptual diagram illustrating an architecture of a reconfigurable radio equipment according to exemplary embodiments of the present disclosure.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term 'terminal' used in the present disclosure may refer to a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terms. Various exemplary embodiments of the terminal may include a cellular telephone, a smart phone having wireless communication capability, a personal digital assistant (PDA) having wireless communication capability, a wireless modem, a portable computer having wireless communication capability, a digital camera having wireless communication capability, a gaming device having wireless communication capability, a music storage and playback home appliance having wireless communication capability, an Internet appliance capable of wireless Internet access and browsing, or the like as well as a portable unit or terminals incorporating combinations of such the functions. However, the exemplary embodiments of the present disclosure are not limited thereto.

The term 'base station' used in the present disclosure may typically refer to a fixed or moving point communicating with the terminal, and may be a term of collectively referring to a base station, a Node-B, an eNode-B, a base transceiver system (BTS), an access point, a relay, a femto-cell, and the like.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

Terminologies used for explaining the present invention are defined as follows. Other terminologies except the following terminologies will be defined in the corresponding part of the present specification.

Baseband Parameter Aggregation (BPA): unit collecting all the context information to be transferred to the monitor. The BPA unit may convert the context information into metric(s) such that a minimum bandwidth is consumed during the procedure of transferring the context information to the monitor. Those metrics may include Received Signal Strength Indication (RSSI) measurement, multi-RAT performance metrics, etc.

Communication services layer: layer related to communication services supporting generic applications. For example, the communication services layer may support generic applications like Internet access. The communication services layer may include an administrator, a mobility policy manager, a networking stack, and a monitor.

Computational resources: part of radio equipment hardware working under control of an operating system (OS). Radio applications may be executed on the computational resources.

Configcodes: result of compiling source codes of a radio application, which is either configuration codes of a radio virtual machine (RVM) or executable codes for a specific target platform. In the case when a radio application provider makes a high level code based on a specific target platform, a result of compiling the source codes of the radio application may be directly executable on the target platform. In other cases, when a radio application provider makes a high level code without considering a specific target platform, a result of front-end compiling of the source codes of the radio application may be intermediate representation (IR) codes. In this case, they should be back-end compiled for operating on a specific target platform.

Data flow: logical channel between a flow controller and a unified radio application, which is used for transmitting data elements (octets, packets, etc.) to the unified radio application or for receiving data elements from the unified radio application.

Distributed computations: computational model among components located on networked computers. Actions of the components may be coordinated by exchanging messages with each other in order to achieve a common goal.

Environmental information: set of values that can affect execution of radio applications on a radio computer. The environmental information may consist of information related to the execution of the radio application, such as buffer overflow, resource allocation, etc.

Functional block (FB): function needed for real-time implementation of the radio application(s). The functional blocks may include not only modem functions in Layer1 (L1), Layer2 (L2), and Layer 3 (L3) but also all control functions that should be processed in real-time for implementing the given radio application(s). The functional blocks may be categorized into standard functional blocks (SFBs) and user defined functional blocks (UDFBs).

The SFB may be shared by many radio applications. For example, forward error correction (FEC), fast Fourier transform (FFT)/Inverse fast Fourier transform (IFFT), (de)interleaver, turbo coding, Viterbi coding, multiple input multiple output (MIMO), beamforming, etc. may be the typical categories of the SFBs.

The UDFB may include functional blocks that are dependent upon a specific radio application. The UDFB may be used to support specific function(s) required for a specific radio application or to support a specific algorithm used for performance improvement. In addition, the UDFB may be used as a baseband controller functional block which controls the functional blocks operating in a baseband processor in real-time, or to control some context information processed in real-time. Each functional block may have its unique name, input, output, and properties.

Peer equipment: communication counterpart of a reconfigurable radio equipment. The peer equipment may be reached by establishing a (logical) communications link (i.e., association) between the reconfigurable radio equipment and the peer equipment. Examples of the peer equipment may include a Wide Local Area Network (WLAN) access point, an Internet Protocol (IP) access node, or the like.

Radio application: software which enforces generation of transmit RF signals and decoding of receive RF signals. The Software may be executed on a specific radio platform or an RVM which is a part of the radio platform. The radio applications may have various forms of representation.

Source codes including radio library calls of radio library native implementation and radio HAL calls IR codes including radio library calls of radio library native implementation and radio HAL calls Executable codes for a specific radio platform Radio computer: part of radio equipment hardware working under radio OS (ROS) control. The radio application may be executed on the radio computer. The radio computer may typically include programmable processors, hardware accelerators, peripherals, etc. An RF part may considered to be a part of the peripherals.

Radio control framework (RCF): control framework which, as a part of the OS, extends OS capabilities in terms of radio resource management. The RCF may include a configuration manager (CM), a radio connection manager (RCM), a flow controller (FC), and a multiradio controller (MRC). A resource manager (RM) may be typically a part of the OS.

Radio controller (RC): functional component of the radio application for transferring context information of the corresponding radio application to the monitor. The RC operating in non-real time computational resources may access a radio application operating in real time on the radio computer. The monitor, to which the context information is transferred using the RC, may provide the context information (e.g., terminal-centric configuration) to the administrator and/or the mobility policy manage (MPM) so that the applications can be performed using the context information.

RF transceiver: part of a radio platform, which converts, for transmission, baseband signals into radio signals, and, for reception, radio signals into baseband signals Radio library: library of SFBs that is provided by a platform vendor in a form of platform-specific executable codes. The SFBs may implement reference codes of functions which are typical for radio signal processing. The SFB may be implemented through a radio hardware abstraction layer (HAL) when the SFB is implemented on the hardware accelerators. The radio HAL is a part of the ROS.

Radio operating system (ROS): OS empowered by the RCF. The ROS provides RCF capabilities as well as traditional management capabilities (e.g., resource management, file system support, unified access to hardware resources, etc.) of the radio platform.

Radio platform: part of radio equipment hardware which relates to radio processing capability. For example, it may include programmable components, hardware accelerators, RF transceiver, and antenna(s). The radio platform may be parts of hardware capable of generating RF signals or receiving RF signals. The radio platform may be fixed accelerators (e.g., application-specific integrated circuit (ASIC)), reconfigurable accelerators (e.g., FPGAs, etc., or the like.

Radio reconfiguration: reconfiguration of parameters related to air interface

Radio virtual machine (RVM): abstract machine which supports reactive and concurrent executions. The RVM may be implemented as a controlled execution environment which allows selection of a trade-off between flexibility of baseband code development and required (re-)certification efforts.

Reconfigurable radio equipment: radio equipment with radio communication capabilities providing support for radio reconfiguration. The reconfigurable radio equipment may be a smartphone, a feature phone, a tablet, a laptop, a connected vehicle communication platform, a network platform, an IoT device, or the like.

Shadow radio platform: platform where configcodes can be directly executed when it corresponds to a target radio platform or, when it corresponds to an RVM, compiled and executed. If the shadow radio platform is equivalent to the target radio platform, then a front-end compiler will generate the executable codes for the target radio platform and the configcodes may be equivalent to the executable codes for that radio platform.

Architecture of Reconfigurable Radio Equipment

FIG. 1 is a conceptual diagram illustrating an architecture of a reconfigurable radio equipment according to exemplary embodiments of the present disclosure.

Referring to FIG. 1, a reconfigurable radio equipment 100 may include at least one radio computer (e.g., 120, 130, 140). In addition, as shown in FIG. 1, the reconfigurable radio equipment 100 may include the following components.

Communication services layer (CSL) 110 may be a layer related to communication services supporting generic applications as described above. The communication services layer may include four sub-components of an administrator 111, a mobility policy manager (MPM) 112, a networking stack 113, and a monitor 114 as logical entities. The communication services layer may generally operate on a non-real time operating system in a separate processor (e.g., application processor (AP)) other than the radio computer.

Radio control frameworks (RCF) 121, 131, and 141 may exist in the respective radio computers. Each radio control framework may include a configuration manager (CM), a radio connection manager (RCM), a flow controller (FC), a multiradio controller (MRC), and a resource manager (RM).

Unified radio applications (URA) 122, 132, and 142 may be radio applications that are execution targets of the reconfigurable radio equipment of the present disclosure. The radio application may be provided by a radio application vendor which is the same as or different from a vendor of the reconfigurable radio equipment. In one radio computer, at least one unified radio application may be executed simultaneously.

Radio platform (RP) 123, 133, or 143 may be a component including baseband processing functions and an RF transceiver, and may be included in each radio computer. On the other hand, when the radio platform is composed of a plurality of baseband processors and/or RF transceivers, the reconfigurable radio equipment may support computational/spectral load balancing.

The four components described above may be interconnected by the following interfaces.

Multiradio Interface (MURI): Interface between the communication services layer and the radio control framework Unified Radio Application Interface (URAI): Interface between the radio control framework and the unified radio application Reconfigurable Radio Frequency Interface (RRFI): Interface between the unified radio application and the RF transceiver(s)

Figure 2:
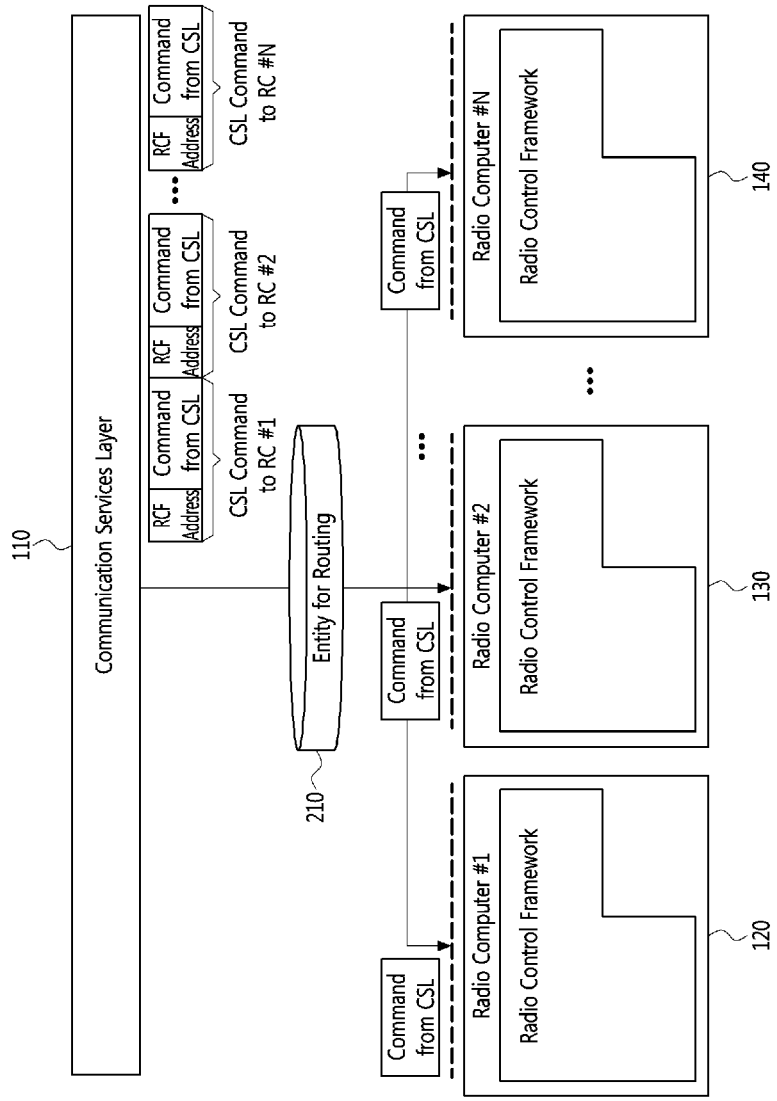
FIG. 2 is a conceptual diagram illustrating a routing entity for communications between a communication services layer and each radio computer in an architecture of a reconfigurable radio equipment according to exemplary embodiments of the present disclosure.

FIG. 2 is a conceptual diagram illustrating a routing entity for communications between a communication services layer and each radio computer in an architecture of a reconfigurable radio equipment according to exemplary embodiments of the present disclosure.

The communication services layer is a layer related to communication services supporting higher layer general applications and supporting specific applications related to multiradio applications. When the radio equipment supports a plurality of radio computers 120, 130, and 140, the communication services layer 110 may generate an identifier (ID) of each radio computer as well as a command for each radio computer. The routing entity 210 is an entity for routing messages generated by the communication services layer to the corresponding radio computer. The routing entity 210 may transfer the generated command from the communication services layer to the corresponding radio computer according to the ID of the radio computer.

The communication services layer may have its own IP address. A management entity above the communication services layer (i.e., an entity above L3 and independent of the communication services layer) may interact with the communication services layer using the IP address. For example, a network function virtualization (NFV) orchestrator may be connected to the communication services layer through the IP address of the communication services layer.

The communication services layer 110 may include the following four entities.

Administrator: the administrator entity may include at least functions for requesting installation or uninstallation of the unified radio application, and functions for creating or deleting instances of the unified radio application. The administrator entity may provide information on the unified radio applications, information on their status, or the like.

In case that a snapshot function is required, the administrator entity may store relevant radio application packages (RAPs), configuration parameters, and information on the installation and execution history of the unified radio applications. When required, the administrator entity may fall back the system to a previous snapshot.

Mobility Policy Manager (MPM): The mobility policy manager may include at least functions for monitoring of the radio environments and capabilities of the radio equipment, to request activation or deactivation of the unified radio application, and to provide a list of the unified radio applications. In addition, the mobility policy manager may perform selection among various radio access technologies (RATs) and discovery of and association with peer equipments. Further, the mobility policy manager may perform computational/spectral load balancing among baseband processors and RF transceivers.

Networking stack: The networking stack may include at least functions for transmitting and receiving of user data.

Monitor: The monitor entity may include at least functions for transferring information from the unified radio application to the user or proper destination entity. In addition, in case that distributed computation is applied, the monitor may receive the computational/spectral resource usage status.

The radio control framework may provide a generic environment for the execution of the unified radio application, and a uniform way of accessing the functionality of the radio computer and individual radio applications. The radio control framework may provide services to the communication services layer via the MURI.

The radio control frame may include the following 5 entities for managing the unified radio application.

Configuration Manager (CM): The configuration manager may include at least functions for installing or uninstalling of the unified radio application and creating or deleting of an instance of the unified radio application as well as management of and access to the radio parameters of the unified radio application.

Radio Connection Manager (RCM): The radio configuration manager may include at least functions for activating or deactivating the unified radio application according to user requests, and to management of user data flows.

Flow Controller (FC): The flow controller may include at least functions for transmitting and receiving of user data packets and controlling the flow of signalling packets.

Multiradio Controller (MRC): The multiradio controller may include at least functions to schedule the requests for radio resources issued by concurrently executing the unified radio applications and to detect and manage the interoperability problems among the concurrently executed unified radio applications. In addition, in case that distributed computation is applied, the multiradio controller may include a function to report spectral resource usage status.

Resource Manager (RM): The resource manager may include at least functions to manage the computational resources, to share them among simultaneously active unified radio applications, and to guarantee their real-time execution. In addition, in case that distributed computation is applied, the resource manager may include a function to report computational resource usage status.

The radio control framework, which represents functionalities provided by the radio computer, may require all radio applications to be subject to common reconfiguration, multiradio execution, and resource sharing strategy framework. Since all radio applications exhibit a common behaviour from the reconfigurable radio equipment perspective, the radio applications may be called the unified radio applications (URAs). The services related to activation and deactivation, peer equipment discovery, and maintenance of communication over user data flows may be provided through the URAI, which is the interface between the unified radio application and the radio control framework.

Figure 3:
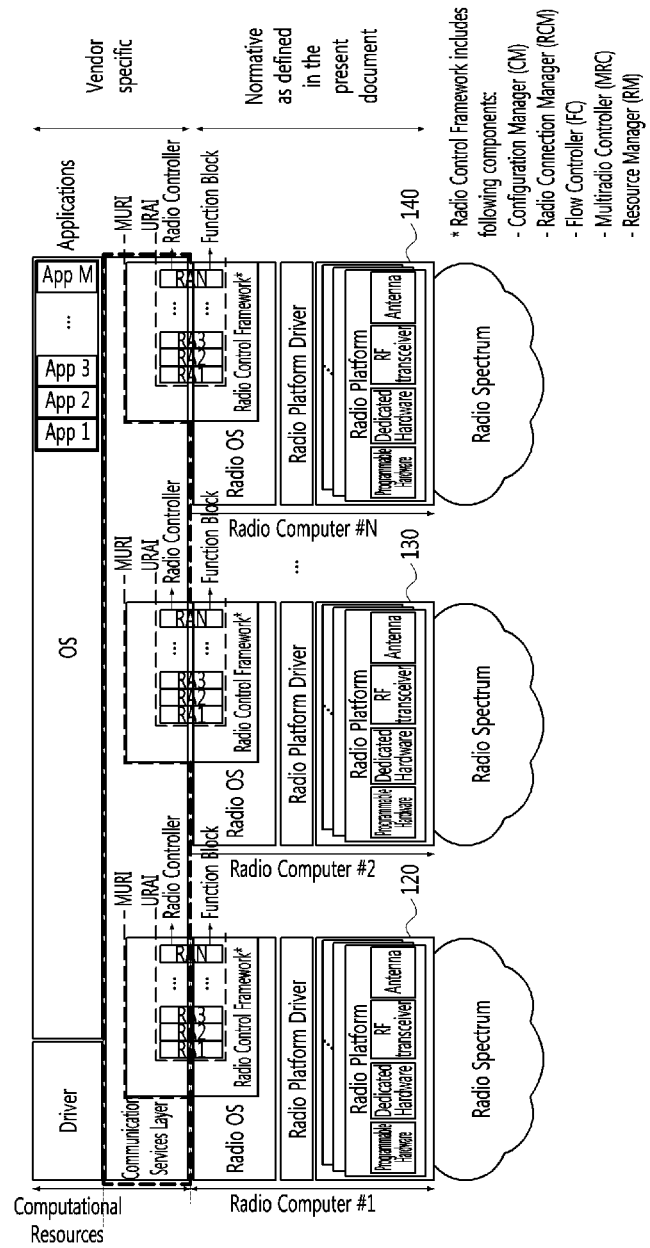
FIG. 3 is a conceptual diagram illustrating multiradio applications in an architecture of a reconfigurable radio equipment according to exemplary embodiments of the present disclosure.

FIG. 3 is a conceptual diagram illustrating multiradio applications in an architecture of a reconfigurable radio equipment according to exemplary embodiments of the present disclosure.

Referring to FIG. 3, the reconfigurable radio equipment may include at least one radio computer 120, 130, and 140. The operation of computational resources may be performed by a given operating system, which is preferably performed on non-real-time basis. On the other hand, the operations of the radio computers may be performed by another operating system, which supports real-time operations of the unified radio application. The operating system of the radio computer may be referred to as radio OS (ROS), and may belong to each radio computer.

The computational resources may include the following components.

A non-real time OS for execution of the administrator, the mobility policy manager, the networking stack, and the monitor which are parts of the above-described communication services layer. For the multiradio applications, the OS may include a computational resources part of the radio control framework.

Radio controller (RC) in the radio application, which is capable of transmitting context information to the monitor and of transmitting/receiving data to/from the networking stack.

The radio computer(s) may include the following components.

Radio OS which is a real-time operating system

The 5 entities of the radio control framework. The 5 entities of the radio control framework may be classified into a group related to real-time execution and a group related to non-real-time execution. Which entities relate to the real-time execution or to the non-real-time execution may vary for each vendor.

Figure 4:
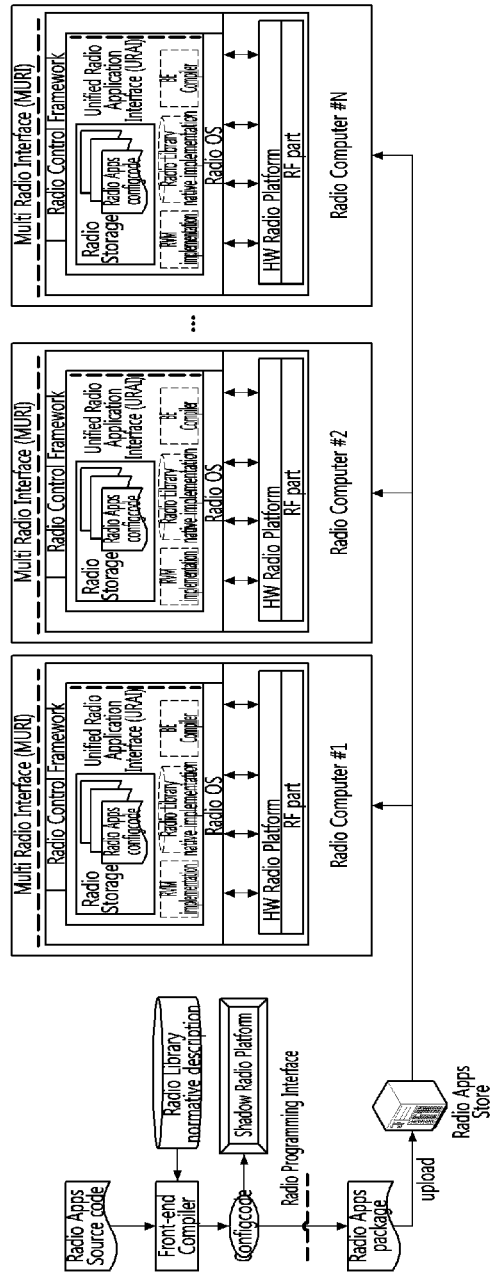
FIG. 4 is a conceptual diagram illustrating an example of a system architecture of a radio computer according to exemplary embodiments of the present disclosure.
Figure 5:
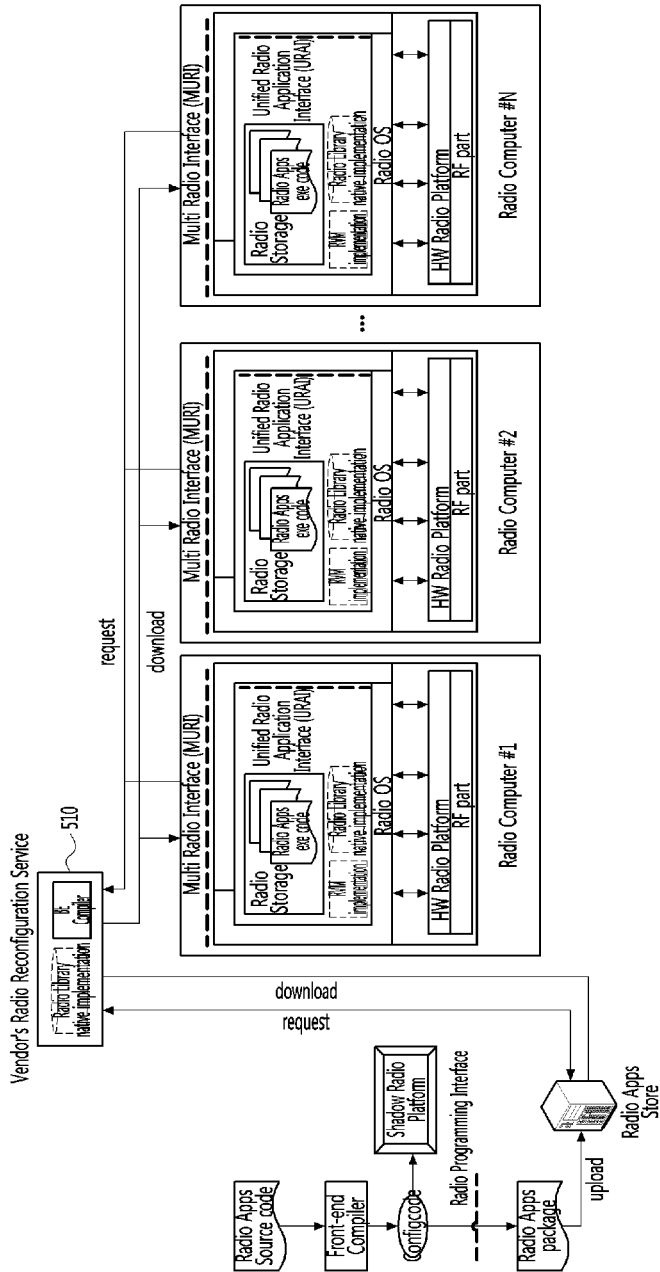
FIG. 5 is a conceptual diagram illustrating another example of a system architecture of a radio computer according to exemplary embodiments of the present disclosure.

FIG. 4 is a conceptual diagram illustrating an example of a system architecture of a radio computer according to exemplary embodiments of the present disclosure, and FIG. 5 is a conceptual diagram illustrating another example of a system architecture of a radio computer according to exemplary embodiments of the present disclosure.

When FIG. 4 is compared with FIG. 5, in the exemplary embodiment of FIG. 4, a back-end compiler is present in each radio computer. However, in the exemplary embodiment of FIG. 5, a back-end compiler exists on a cloud. In order to properly support the performance management and update of the back-end compiler, the back-end compiler may be managed on a cloud rather than on each radio computer.

The radio computer may provide communication capabilities for the reconfigurable radio equipment, and may comprise the following components according to the type of the reconfigurable radio equipment.

Radio OS including the radio control framework

Unified radio application configuration codes (configcodes), which are executable codes, source codes, or IR codes Radio virtual machine (RVM)

Radio library native implementation when the unified radio application configcodes are compiled within the reconfigurable radio equipment, or when the unified radio application configcodes are compiled in a cloud with dynamic linking Radio platform.

The unified radio application configcodes may be executable codes, or may be interpreted by the radio virtual machine.

A front-end compiler may generate the executable codes for the target platform, and the configcodes may be equivalent to the executable codes for the target platform. In this case, the radio library native implementation and back-end compiler shown in FIG. 4 may not be required in the radio computer.

The radio virtual machine is an abstract machine which is capable of executing the configcodes and it is independent of the hardware. The implementation of the radio virtual machine may be specific to the target radio computer, and the radio virtual machine may include the back-end compiler which provides a Just-in-Time (JIT) or Ahead-of-Time (AOT) method for compilation of the configcodes into the executable codes.

When the unified radio application configcodes are source codes or IR codes, the back-end compiler may be implemented in 2 different manners. That is, the unified radio application may be compiled at a given radio equipment, or the unified radio application may be compiled on a cloud.

In the former case, as shown in FIG. 4, the radio library native implementation and the back-end compiler may be present within the radio computer. Therefore, in this case, the unified radio application configcodes may be downloaded into the radio computer in the form of source codes or IR codes, and may be transformed into the corresponding executable codes through the back-end compiler within the radio computer. In this case, the back-end compiler may be a part of the radio virtual machine.

In the latter case, as shown in FIG. 5, the compilation process may be performed in the cloud not within the radio computer. Therefore, the unified radio application configcodes may be downloaded into the radio computer in the form of executable codes as a result of the compilation at the cloud. In this case, the platform vendor should provide the back-end compiler and/or the radio library native implementation in accordance with its radio platform to the cloud.

Meanwhile, the radio library native implementation should be provided to the cloud or the radio equipment in the case of static/dynamic linking which will be described. The radio library may be composed of SFBs. One radio application may be expressed as a set of SFBs and UDFBs which are interconnected. The SFBs provided from normative description of the radio library may be represented in a platform-independent normative language. The native implementation of the radio library may be provided as platform-specific codes of the SFBs from the library for the target platform. The radio library may be extendable.

In FIGS. 4 and 5, a radio application store (i.e., RadioApp store) may have a radio programming interface (RPI).

Distribution and Installation of Unified Radio Application

The radio applications loaded into the reconfigurable radio equipment may be called unified radio applications (URAs). The procedure of distributing and executing the unified radio applications may consist of 3 steps: a design time, an installation time, and a run time.

FIGS. 6 to 10 are conceptual diagrams for explaining a distribution/execution process of a unified radio application according to exemplary embodiments of the present disclosure.

FIGS. 6 to 10 describe a process of distributing/executing a radio application in the form of platform-specific executable codes, a process of distributing/executing a radio application in the form of platform-independent source codes, and a process of distributing/executing a radio application in the form of platform-independent IR codes.

During the design time, the radio application codes provider may generate a radio application package (RAP). The RAP may include metadata for pipeline configuration and radio application codes. Radio controller codes may a part of the radio application codes. In case that the radio controller codes are executed in the non-real-time environment, they may be compiled to be executed in given computational resources before they are included in the RAP.

During the installation time, the RAP may be downloaded from a RadioApp store and installed in the reconfigurable radio equipment. The radio application codes, including the radio controller codes, and the metadata (e.g. for pipeline configuration) included in the RAP may installed in the reconfigurable radio equipment. Although the functional blocks such as the SFBs and the UDFBs should be installed in the radio computer to be processed in real-time, the radio controller codes operating in the non-real time domain may be installed in the computational resources for operations that do not need real time processing such as context information processing.

Figure 6:
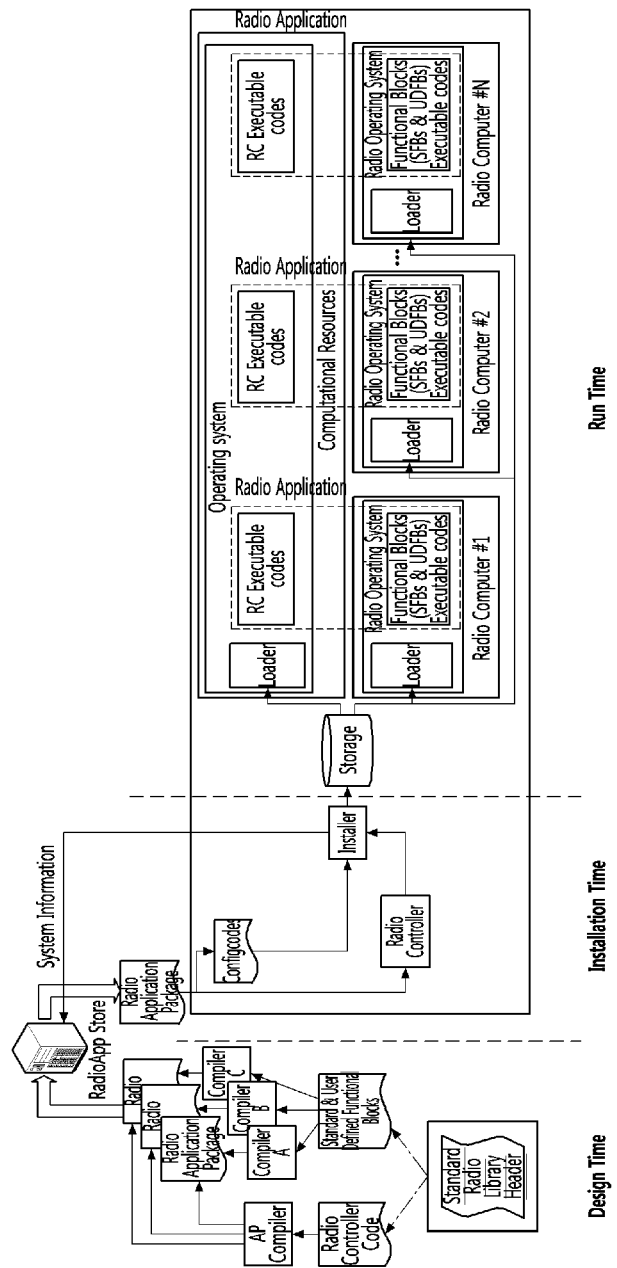
FIGS. 6 to 10 are conceptual diagrams for explaining a distribution/execution process of a unified radio application according to exemplary embodiments of the present disclosure.

Referring to FIG. 6, there is shown a case in which configcodes executable in a given reconfigurable radio equipment are distributed. When the configcodes are executable, the functional blocks (SFBs and UDFBs) may be executed on the radio computer. The functional blocks may be compiled for each target platform during the design time to generate the corresponding configcodes. That is, the SFBs and UDFBs may be complied according to a given radio computer, and included in the RAP during the design time. After compilation, the configcodes, including the UDFBs and the SFBs, may be installed and loaded into the reconfigurable radio equipment to be operated on the radio OS.

Figure 7:
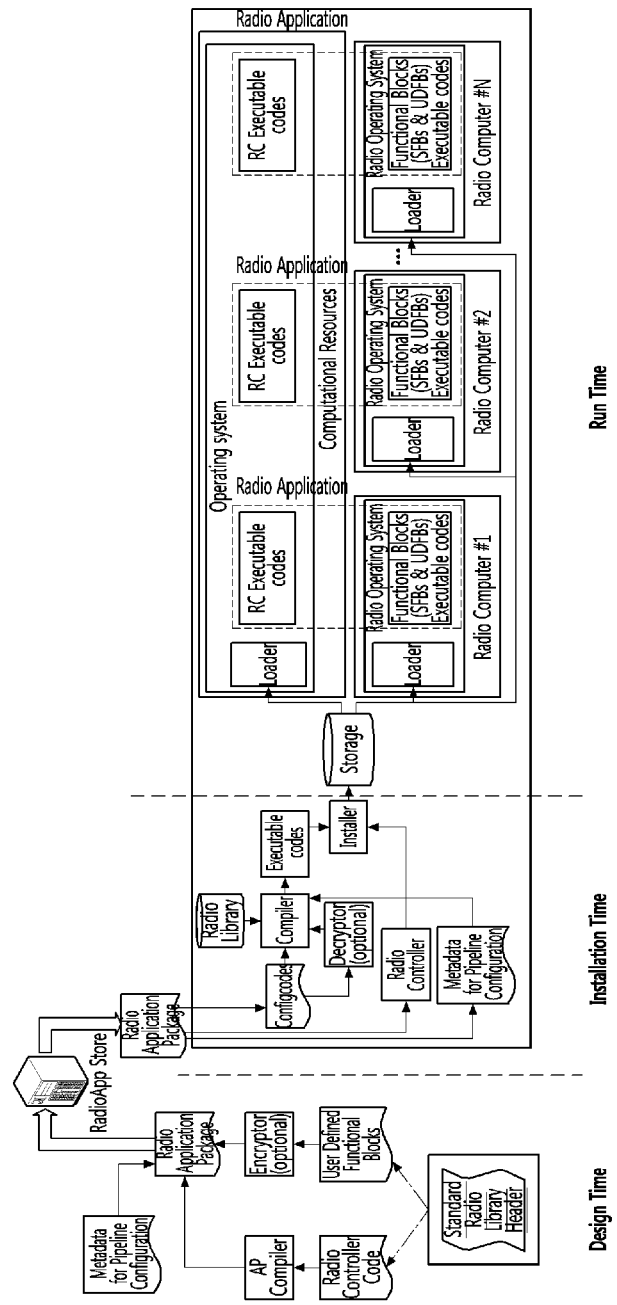
Figure 8:
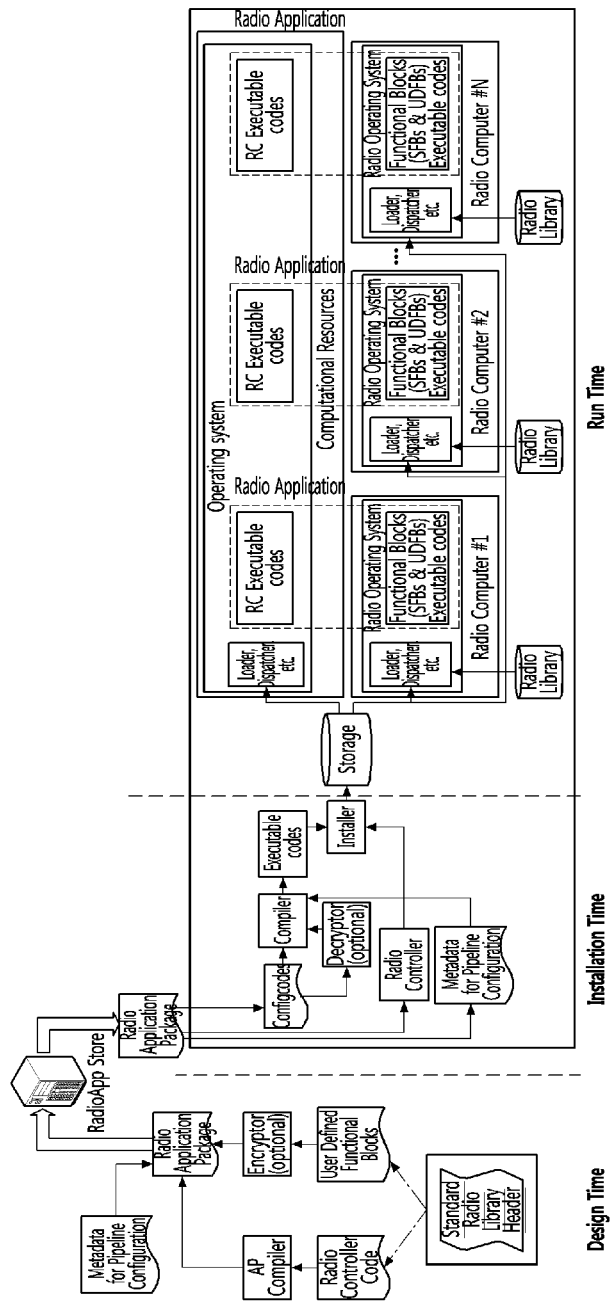

Referring to FIGS. 7 and 8, there are shown cases of distributing the configcodes in the form of platform-independent source codes for static linking and dynamic linking respectively. When the configcodes are provided in the form of platform-independent source codes, the radio application codes may include the radio controller codes and UDFB codes only. In case of the SFBs, the metadata may provide information for efficient compilation. The function calls of the SFBs that are needed to execute the target unified radio application may be included in the configcodes. The configcodes consisting of the UDFBs may be compiled in the reconfigurable radio equipment or in the cloud during the installation time. The native implementation of the SFBs may be done before the run time and may be included in the native library.

FIG. 7 shows a case of static linking, and in this case, the linking of the UDFBs and the SFBs may be performed during the installation time. During the run time, the compiled codes may be loaded to be executed on the ROS. FIG. 8 shows a case of dynamic linking, and in this case, the linking of the UDFBs and the SFBs may be performed during the run time.

As shown in FIGS. 7 and 8, the radio application codes may be optionally encrypted. If the radio application codes were originally encrypted then the corresponding configcodes should be decrypted before the compilation during the installation time.

Figure 9:
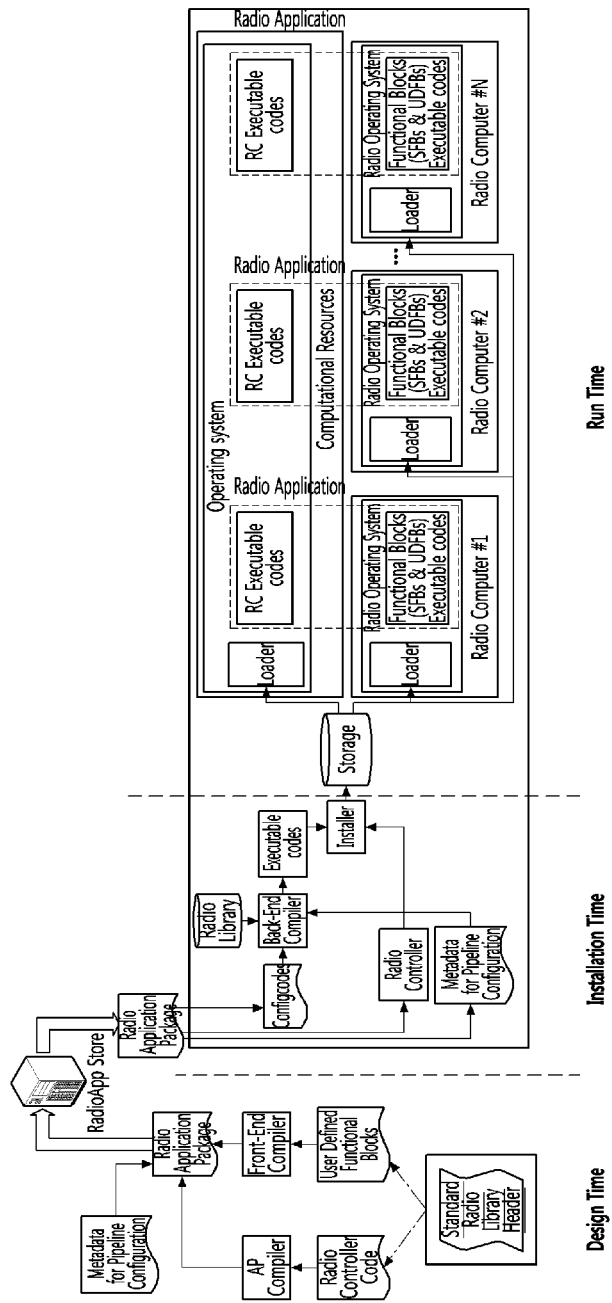
Figure 10:
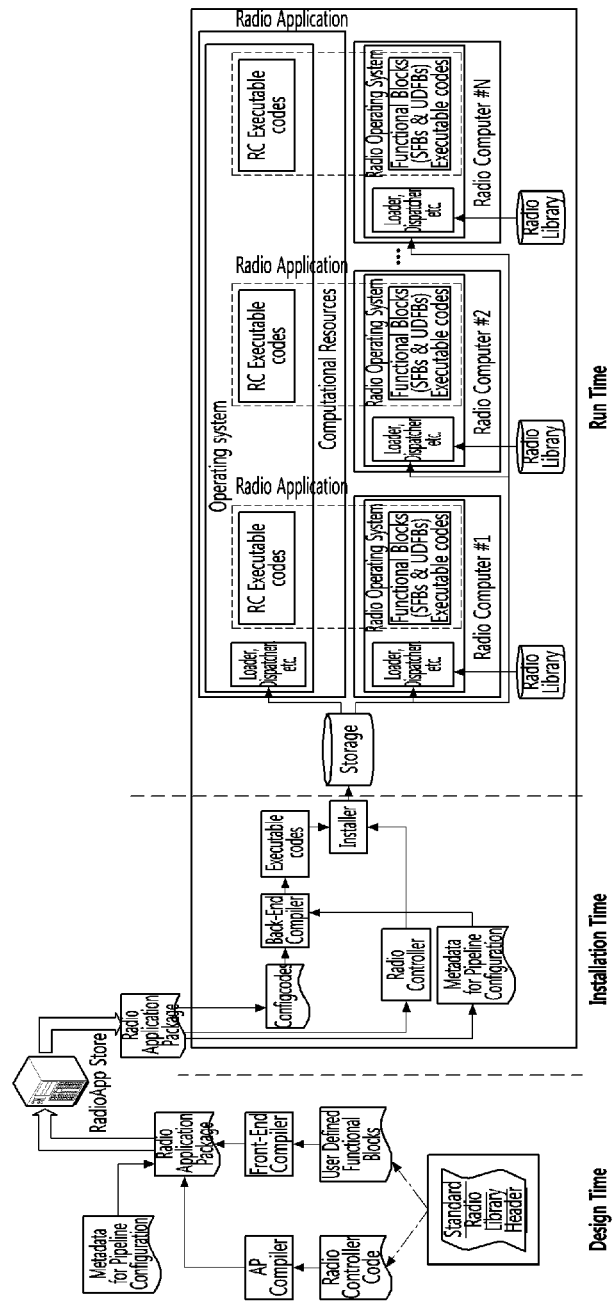

Referring to FIGS. 9 and 10, there are shown cases of distributing the configcodes are distributed in the form of platform-independent IR codes for static linking and dynamic linking respectively. When the configcodes are provided in the form of platform-independent IR codes, the radio application configcodes which include the UDFB codes may be front-end compiled during the design time. At the installation time, the front-end compiled configcodes may be back-end compiled at the reconfigurable radio equipment to be translated into executable codes specific to a given radio computer. The native implementation of the SFBs may be done before the run time and may be included in the native library.

FIG. 9 shows a case of static linking, and in this case, the linking of the UDFBs and the SFBs may be performed during the installation time. During the run time, the back-end compiled codes may be loaded to be executed on the ROS. FIG. 10 shows a case of dynamic linking, and in this case, the linking of the UDFBs and the SFBs may be performed during the run time.

Operational Structure of Unified Radio Application

The operational structure of the unified radio application in the run time will be described. For simplicity of description, a case where the radio equipment is equipped with one radio computer may be assumed. That is, the same operational structure may be applied to each radio computer within the radio equipment. The following two cases are considered.

Case where the unified radio application configcodes are codes executable on the given radio equipment.

Case where the unified radio application configcodes are source codes or IR codes that are to be compiled at the given radio equipment.

Figure 11:
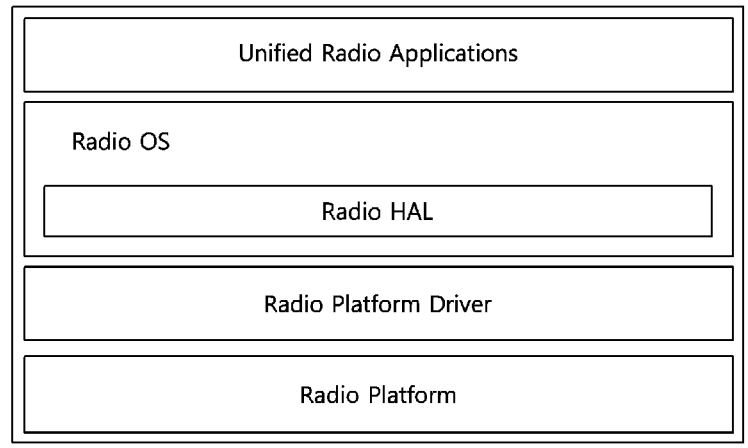
FIGS. 11 to 13 are conceptual diagrams for describing an operational structure of a unified radio application according to exemplary embodiments of the present disclosure.
Figure 12:
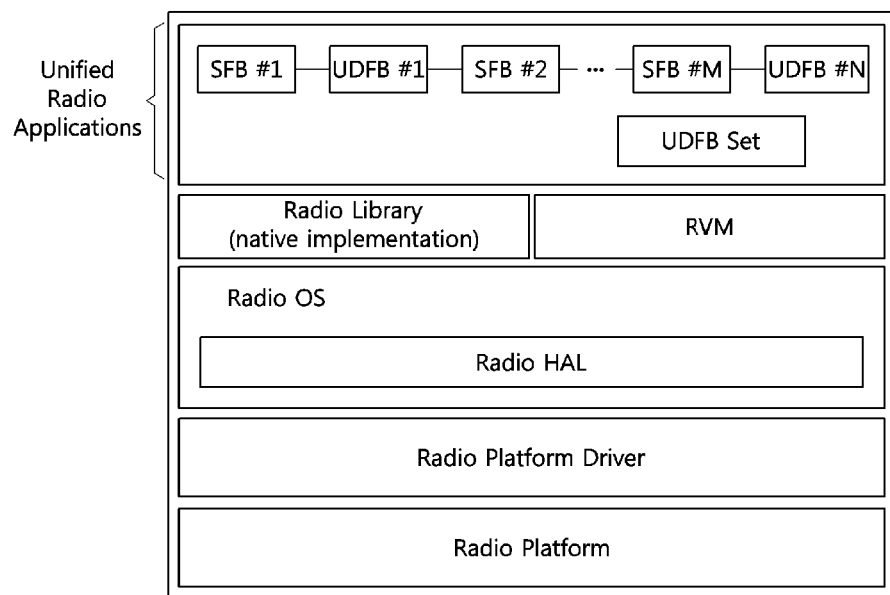
Figure 13:
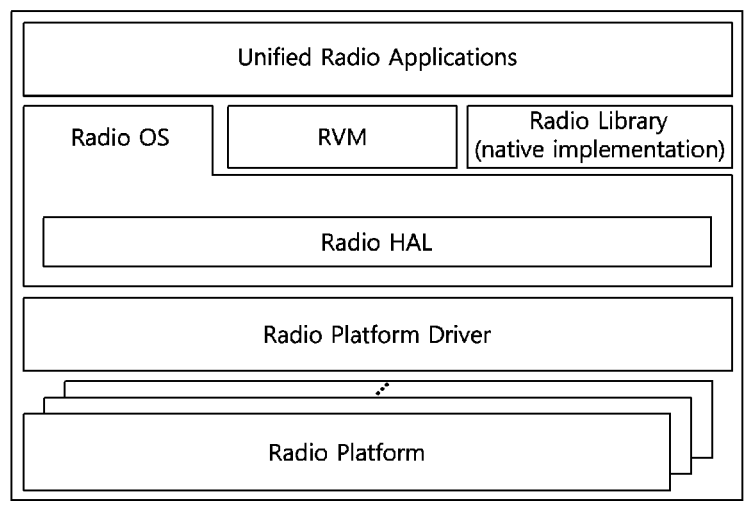

FIGS. 11 to 13 are conceptual diagrams for describing an operational structure of a unified radio application according to exemplary embodiments of the present disclosure.

The SFBs may be classified into two groups. That is, one group is a group of SFBs requiring dedicated hardware accelerators, and the other group is a group of SFBs not requiring dedicated hardware accelerators. In case that a dedicated hardware accelerator is used, the hardware accelerator may be accessed through the radio HAL. In the other case, platform-specific codes may be provided for the related SFBs by the radio library.

Referring to FIG. 11, the operational structure of the unified radio application is shown when the unified radio application configcodes are given as executable codes for the given radio equipment. In this case, the SFBs and UDFBs needed to perform the given unified radio application are already bound in the executable configcodes of the unified radio application.

Referring to FIG. 12, the operational structure of the unified radio application is shown when the unified radio application configcodes are source codes or IR codes that need to be compiled in the given radio equipment. In this case, the UDFBs needed to perform the given unified radio application are included in the configcodes of the unified radio application, and are compiled by the compiler (in case of source codes) or by the back-end compiler (in case of IR codes). Meanwhile, the radio library native implementation may need to be prepared in the given radio equipment separately because the radio library native implementation cannot be included in the unified radio application configcodes. As described above, the function calls of the SFBs may provided in the metadata.

The radio library native implementation is provided by the radio computer vendor because the radio library includes the SFBs that are implemented on the radio computer. The SFBs may be implemented without using hardware accelerators or for combining the hardware accelerators and program codes to generate another SFB(s).

Referring to FIG. 13, a hybrid operational structure of the former two cases is shown. That is, the unified radio application may consist of executable codes and IR codes. The operational procedure for the executable codes in this case may be equivalent to that of the case shown in FIG. 11. The IR part of the unified radio application may be processed in the radio virtual machine. In this way, the IR part may be executed in run-time. The radio virtual machine may be implemented, for example, as an interpreter, a just-in-time compiler, etc.

In the above-described 3 cases, the radio HAL includes hardware abstraction for implementation of the SFBs using hardware accelerators. This means that, whenever the SFBs implemented using hardware accelerators are called by the given unified radio application codes, they are implemented directly on the corresponding hardware accelerator(s) through the radio HAL. As will be discussed later, the radio HAL needs to include also a hardware abstraction for the UDFBs that are composed of a set of SFBs at least one of which is implemented using the hardware accelerators.

The SFBs may be functional blocks which are commonly used by many radio applications (e.g. fast Fourier transform (FFT)) and functional blocks which should be very efficiently implemented using special-purpose accelerators in the given radio platform (e.g., turbo coder). Therefore, the SFBs may be implemented in software or dedicated hardware.

Meanwhile, the 'UDFB set' shown in FIG. 12 includes the UDFBs to be used by the given unified radio application. It is important that any SFB can be modified and/or extended by replacing it with appropriate UDFB(s). Therefore, the UDFBs may be good candidate(s) for SFBs extension, which means that they may be added as the SFBs. In this case, after the UDFBs are added as the SFBs, they will be defined as normal SFBs. Since the UDFB set is to be provided by the radio application provider (e.g., a $3^{rd}$ party) instead of the radio platform vendor, in order for the radio control framework to be able to perform basic controls on events and/or commands for every UDFB, a standard set of control interfaces, such as 'start', 'stop', 'pause', 'get_port', and 'initialize', may have to be specified for the corresponding UDFBs.

The operational structure of the unified radio application of FIGS. 11 to 13 may include the following components.

The unified radio application may include SFB(s) and UDFB(s) in accordance with the contents of metadata in a given RAP.

The radio library may include platform-specific codes of the SFBs that will be implemented on the radio computer. The SFBs which are implemented using hardware accelerators may be supported by the radio HAL. In this case, the radio library may typically include function calls to access the hardware accelerator(s).

The user-defined functional block set UDFB set may include all the UDFBs to be used by the given unified radio application, and may generally be provided by the radio application provider. The UDFBs may be included in the RAP together with the metadata and the radio controller codes. Since the UDFB is generally a modified and/or extended version of the SFBs, the UDFB in many cases may have a dependency on the SFBs.

The radio HAL abstracts the radio platform. The radio HAL may support the SFBs implemented using hardware accelerators in order for the SFBs to be implemented directly on the corresponding hardware accelerator(s).

The radio platform driver is a hardware driver used by the ROS to access the radio platform.

The radio platform in general may include RF transceiver, antenna(s), fixed and/or configurable hardware accelerator(s), and/or programmable IP core(s).

Figure 14:
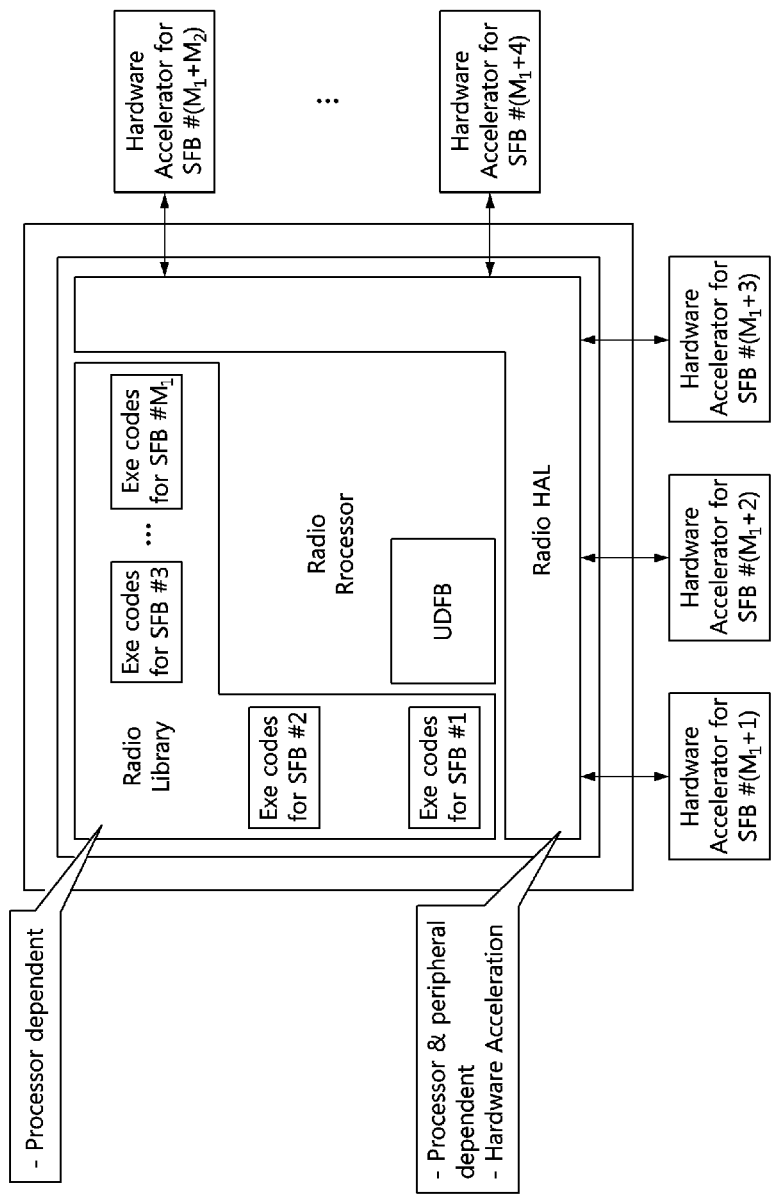
FIG. 14 is a conceptual diagram illustrating implementation of functional blocks on a radio computer according to exemplary embodiments of the present disclosure.

FIG. 14 is a conceptual diagram illustrating implementation of functional blocks on a radio computer according to exemplary embodiments of the present disclosure.

Referring to FIG. 14, the number of SFBs for programmable components may be M1 and the number of SFBs requiring dedicated hardware accelerators may be M2. Therefore, the total number M of SFBs may be M1+M2. As described above, some SFBs (e.g., FFT, turbo decoder, MIMO decoder, etc.) may be implemented directly on the corresponding hardware accelerator to achieve high performance and low power consumption. Those SFBs that are executed by the hardware accelerator(s) are supported by the radio HAL for the implementation on the corresponding dedicated accelerator(s). This means that, when each SFB to be implemented on the dedicated accelerator(s) is called by the unified radio application, it is implemented directly on the corresponding dedicated accelerator(s) through the radio HAL. Similarly, operations such as bit-reverse, multiply, and accumulation, etc. provided by SFBs may be implemented on the programmable components.

Consequently, the SFB/UDFB execution codes required on the radio computer consists of the following two parts. One part is execution codes implemented on the programmable components and the other part is radio HAL codes implemented on the dedicated accelerators.

This may be summarized as follows. {C: execution codes required on radio computer for SFBs/UDFBs implementation}={A: execution codes for SFBs/UDFBs for programmable components}+{B: radio HAL codes for SFBs/UDFBs requiring dedicated hardware accelerators}. That is, (C=A+B) may be defined, and the portions of A and B may be determined by each vendor.

This may also imply the following. {SFBs/UDFBs} is a union of {SFBs/UDFBs for programmable components} and {SFBs/UDFBs requiring dedicated hardware accelerators}, and an intersection of {SFBs/UDFBs for programmable components} and {SFBs/UDFBs requiring dedicated hardware accelerators} may be an empty set.

The reason why the SFBs are classified into two groups (i.e., a group requiring hardware accelerators and a group not requiring hardware accelerators), is that each category has its own pros and cons. Since the former is implemented on dedicated hardware accelerators, it is advantageous, e.g. for power consumption, speed-up operation, and, cost-effectiveness. On the other hand, since the latter is typically implemented on a microprocessor, it is advantageous mainly for flexibility. It is expected that the dedicated hardware accelerator(s) will be used relatively more widely at the beginning stage until programmable devices become competitive to dedicated hardware devices in performance. As semiconductor technology evolves, the SFBs for programmable components will gradually become more and more dominant in a long term standpoint.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A reconfigurable radio equipment comprising:
   at least two radio computers;
   a communication services layer including an administrator, a mobility policy manager, a network stack, and a monitor; and
   a routing entity performing communications among the at least two radio computers and the communication services layer,
   wherein the communication services layer operates on a non-real time operating system, each of the at least two radio computers includes a radio operation system which is a real time operating system, and a unified radio application (URA) operates in the at least two radio computers.

2. The reconfigurable radio equipment according to claim 1, wherein the administrator of the communication services layer is an entity that performs installation or uninstallation of the unified radio application on the at least two radio computers and creation or deletion of an instance of the unified radio application.

3. The reconfigurable radio equipment according to claim 1, wherein the mobility policy manager of the communication services layer is an entity that performs monitoring of radio environments and capability of the radio equipment, selection among various radio access technologies (RATs), and discovery of peer equipments.

4. The reconfigurable radio equipment according to claim 1, wherein the networking stack of the communication services layer is an entity that performs transmission and reception of user data.

5. The reconfigurable radio equipment according to claim 1, wherein the monitor of the communication services layer is an entity that performs a function of receiving computational/spectral resource usage status.

6. The reconfigurable radio equipment according to claim 1, wherein each of the at least two radio computers includes:
   a radio control framework (RCF) providing an operation environment to the unified radio application;
   the radio operating system; and
   at least one radio platform.

7. The reconfigurable radio equipment according to claim 6, wherein the radio control framework includes:
   a configuration manager performing functions for managing and accessing radio parameters for the unified radio application, functions for installing or uninstalling the unified radio application, and functions for creating or deleting an instance of the unified radio application;
   a radio connection manager performing functions for activating/deactivating the unified radio application according to user requests and management of user data flows;
   a flow controller performing functions for transmitting and receiving user data packets and controlling a flow of signaling packets;
   a multiradio controller performing functions for detecting and managing interoperability problems among concurrently executed unified radio applications; and
   a resource manager performing functions for managing computational resources of a corresponding radio computer and functions for making active unified radio applications share the computational resources.

8. The reconfigurable radio equipment according to claim 1, wherein the routing entity receives a command for a target radio computer and an identifier (ID) of the target radio computer from the communication services layer, and uses the ID of the target radio computer to transfer the command to the target radio computer.

9. The reconfigurable radio equipment according to claim 1, wherein the unified radio application is downloaded and installed in the at least two radio computers by using a radio application package (RAP), the RAP comprising:
   metadata;
   radio controller codes; and
   at least one user-defined functional block (UDFB).

10. The reconfigurable radio equipment according to claim 9, wherein the radio controller codes are a component that operates in a non-real time domain and processes context information, and is included in the RAP in form of executable codes.

11. The reconfigurable radio equipment according to claim 9, wherein the at least one UDFB is included in the RAP in form of at least one of source codes, intermediate representation codes, and executable codes executable on at least one of the at least two radio computers.

12. The reconfigurable radio equipment according to claim 11, wherein when the at least one UDFB is included in the RAP in form of the source codes or the intermediate expression codes, the at least one UDFB is executed by a radio virtual machine (RVM).

13. A method for communications within a reconfigurable radio equipment including at least two radio computers, a communication services layer, and a routing entity performing communications among the at least two radio computers and the communication services layer, the method comprising:
   receiving, by the communication services layer, a command for a target radio computer among the at least two radio computers from an entity of a higher layer;
   generating, by the communication services layer, an identifier (ID) of the target radio computer;
   transmitting, by the communication services layer, the command and the ID of the target radio computer to the routing entity; and
   transferring, by the routing entity, the command to the target radio computer by using the ID,
   wherein the communication services layer operates on a non-real time operating system, each of the at least two radio computers includes a radio operation system which is a real time operating system, and a unified radio application (URA) operates in the at least two radio computers.

14. The method according to claim 13, wherein each of the at least two radio computers includes:
   a radio control framework (RCF) providing an operation environment to the unified radio application;
   the radio operating system; and
   at least one radio platform.

15. The method according to claim 14, wherein the radio control framework includes:
   a configuration manager performing functions for managing and accessing radio parameters for the unified radio application, functions for installing or uninstalling the unified radio application, and functions for creating or deleting an instance of the unified radio application;
   a radio connection manager performing functions for activating/deactivating the unified radio application according to user requests and management of user data flows;

a flow controller performing functions for transmitting and receiving user data packets and controlling a flow of signaling packets;

a multiradio controller performing functions for detecting and managing interoperability problems among concurrently executed unified radio applications; and a resource manager performing functions for managing computational resources of a corresponding radio computer and functions for making active unified radio applications share the computational resources.

16. The method according to claim 13, wherein the communication services layer includes an administrator, a mobility policy manager, a networking stack, and a monitor.

17. The method according to claim 16, wherein the administrator of the communication services layer is an entity that performs installation or uninstallation of the unified radio application on the at least two radio computers and creation or deletion of an instance of the unified radio application.

18. The method according to claim 16, wherein the mobility policy manager of the communication services layer is an entity that performs monitoring of radio environments and capability of the radio equipment, selection among various radio access technologies (RATs), and discovery of peer equipments.

19. The method according to claim 14, wherein the unified radio application is downloaded and installed in the at least two radio computers by using a radio application package (RAP), the RAP comprising:

metadata;

radio controller codes; and at least one user-defined functional block (UDFB).

* * * * *